US012006757B2

(12) United States Patent
Kim et al.

(10) Patent No.: US 12,006,757 B2
(45) Date of Patent: Jun. 11, 2024

(54) OVERSLAM BUMPER HAVING FIXING FORCE AND BUFFERING PROPERTY

(71) Applicant: DMC, INC, Seongnam-si (KR)

(72) Inventors: Hyung Joon Kim, Seoul (KR); Hyung Jin Kim, Yeongcheon-si (KR); Jung Un Jung, Gyeongsan-si (KR); Byung Gu Jang, Yeongcheon-si (KR); Jong Hyun Park, Yeongcheon-si (KR); Won Wook Lee, Yeongcheon-si (KR); Gi Uk Seo, Gyeongsan-si (KR)

(73) Assignee: DMC, INC, Seongnam-si (KR)

( * ) Notice: Subject to any disclaimer, the term of this patent is extended or adjusted under 35 U.S.C. 154(b) by 214 days.

(21) Appl. No.: 17/608,161

(22) PCT Filed: Jan. 9, 2020

(86) PCT No.: PCT/KR2020/000400
§ 371 (c)(1),
(2) Date: Nov. 2, 2021

(87) PCT Pub. No.: WO2020/246681
PCT Pub. Date: Dec. 10, 2020

(65) Prior Publication Data

US 2022/0290479 A1 Sep. 15, 2022

(30) Foreign Application Priority Data

Jun. 7, 2019 (KR) ........................ 10-2019-0067581

(51) Int. Cl.
*E05F 5/02* (2006.01)

(52) U.S. Cl.
CPC ......... *E05F 5/025* (2013.01); *E05Y 2201/224* (2013.01); *E05Y 2900/531* (2013.01)

(58) Field of Classification Search
CPC ... E05F 5/025; E05F 5/022; E05F 5/02; E05F 5/08; E05F 5/10
See application file for complete search history.

(56) References Cited

U.S. PATENT DOCUMENTS 6,039,388 A * 3/2000 Choi ........................ E05F 5/022 267/152
8,056,965 B2 * 11/2011 Rosemann .............. E05F 5/022 16/86 A (Continued)

FOREIGN PATENT DOCUMENTS

EP 1258589 A1 11/2002
JP 08-021474 A 1/1996

(Continued)

OTHER PUBLICATIONS

International Search Report for PCT/KR2020/000400 dated Apr. 16, 2020 from Korean Intellectual Property Office.

*Primary Examiner* — Jeffrey O'Brien
(74) *Attorney, Agent, or Firm* — Revolution IP, PLLC

(57) ABSTRACT

Disclosed herein is an over-slam bumper for a vehicle. The over-slam bumper includes: a bumper unit (100) of which an end portion protrudes toward a door to absorb shock generated between a vehicle body and the door; and a mounting unit (200) coupled with the bumper unit (100) to fix the bumper unit to the vehicle body, wherein the bumper unit (100) includes: an elastic part for absorbing shock generated when getting in contact with the door; and a coupling part (116) connected to the elastic part and coupled with the mounting unit (200). The elastic part includes a buckling part (111) for absorbing shock by buckling; a compression part (130) for absorbing shock by compression; and an elastic air compression part for absorbing shock by sealing the inside air to compress inside air.

12 Claims, 11 Drawing Sheets

Cross section B-B'

(56) References Cited

U.S. PATENT DOCUMENTS

| | | | | | |
|---|---|---|---|---|---|
| 8,291,547 | B2 * | 10/2012 | Ukai | E05F 5/022 | 267/141 |
| 8,407,857 | B2 * | 4/2013 | Sugiyama | F16F 1/371 | 267/141 |
| 8,677,563 | B2 * | 3/2014 | Diep | E05F 5/08 | 267/140 |
| 9,739,327 | B2 * | 8/2017 | Kamiya | E05F 5/022 | |
| D817,162 | S * | 5/2018 | Kaji | F16B 21/086 | D8/382 |
| 9,963,917 | B2 * | 5/2018 | Reyes Luna | E05B 17/0041 | |
| 10,150,444 | B1 * | 12/2018 | Schwalm | E05F 5/02 | |
| 10,570,655 | B2 * | 2/2020 | Nakasone | E05C 19/16 | |
| 10,689,894 | B2 * | 6/2020 | Diez Herrera | E05F 5/025 | |
| 2014/0150207 | A1 * | 6/2014 | Hattori | F16F 9/20 | 267/140.13 |
| 2022/0333421 | A1 * | 10/2022 | Kwak | B60J 5/101 | |

FOREIGN PATENT DOCUMENTS

| | | | |
|---|---|---|---|
| JP | 2005-343284 | A | 12/2005 |
| JP | 2013-019466 | A | 1/2013 |
| KR | 10-2002-0059462 | A | 7/2002 |
| KR | 10-2019-0007545 | A | 1/2019 |
| KR | 10-2019-0056022 | A | 5/2019 |

* cited by examiner

Cross section A-A'

Cross section B-B'

SECTION "A-A'"

OVERSLAM BUMPER HAVING FIXING FORCE AND BUFFERING PROPERTY

TECHNICAL FIELD

The present invention relates to an over-slam bumper for a vehicle, and more particularly, to an over-slam bumper which has a bumper unit for absorbing shock in order to mitigate shock and noise generated when a door of a vehicle is shut.

BACKGROUND ART

Generally, an over-slam bumper for a vehicle is a device to mitigate shock and noise generated when a door of a vehicle is shut.

The over-slam bumper for a vehicle can mitigate shock and noise by first touching the door of the vehicle when the door is opened or closed.

A conventional over-slam bumper is sometimes out of a contact surface of a component to come into contact with the over-slam bumper since fixed to an opening and closing device. In this instance, the over-slam bumper may not sufficiently perform the functions to absorb shock and mitigate noise.

Moreover, when the over-slam bumper is installed between a vehicle body and a door, if a worker adjusts a protrusion height of the over-slam bumper to be excessive, excessive reaction force is generated when the door is closed. So, it is difficult to secure uniform quality.

Furthermore, the conventional over-slam bumper has another disadvantage in that work efficiency is deteriorated due to repeated adjustment of an interval between the vehicle body and the over-slam bumper since the worker cannot know a movement amount depending on the rotation of the over-slam bumper.

Additionally, the conventional over-slam bumper can maintain uniform repulsive power at a predetermined section when a door to which the over-slam bumper is installed is closed, and has several disadvantages in that a groove part with which the over-slam bumper gets in contact is damaged since the repulsive power increases in proportion to the section, and in that there is a risk that a passenger is injured since an intrusion amount of the door into the vehicle is increased.

DISCLOSURE

Technical Problem

Accordingly, the present invention has been made in an effort to solve the above-mentioned problems occurring in the prior arts, and it is an object of the present invention to provide an over-slam bumper, which has a cross-sectional shape that the outer peripheral surface of a damping part is buckled in order to show uniform repulsive power when a door is closed.

It is another object of the present invention to provide an over-slam bumper, which has indication parts formed at regular intervals so that a worker can find a vertical movement amount depending on rotation when adjusting height of the over-slam bumper, and which has a fixation device using a stopper and a stopper guide part.

It is a further object of the present invention to provide an over-slam bumper, which can maintain uniform repulsive power at a predetermined section when the door is closed, and which further has a column-shaped stopper when the door is closed by excessive power.

However, objects of the present invention are not limited to the objects described above, and other objects that are not described will be clearly understood by a person skilled in the art from the description below.

Technical Solution

To achieve the above objects, the present invention provides an over-slam bumper including: a bumper unit 100 of which an end portion protrudes toward a door to absorb shock generated between a vehicle body and the door; and a mounting unit 200 coupled with the bumper unit 100 to fix the bumper unit to the vehicle body.

The bumper unit 100 includes: an elastic part for absorbing shock generated when getting in contact with the door; and a coupling part 140 connected to the elastic part and coupled with the mounting unit 200.

Moreover, the elastic part includes: a bumper head part 120 having a contact surface getting in contact with the surface of the door; a buckling part 111 for absorbing shock by buckling when shock is applied to the bumper head part 120; and a compression part for absorbing shock by compression.

Furthermore, the buckling part 111 is formed below the bumper head part 120 in a cylindrical shape, a space part 150 opened downwards is formed inside the bumper unit 100, a protrusion part 160 is formed on the space part 150 to be formed integrally with the bumper head part 120, and a ring-shaped part 114 is formed by an outer peripheral surface 112 of the buckling part 111 and an inner peripheral surface 113 of the space part. It is preferable that the ring-shaped part 114 be buckling-transformed by a load of the bumper head part 120.

Additionally, the ring-shaped part 114 includes: a first ring-shaped part connected to the bumper head part; and a second ring-shaped part formed below the first ring-shaped part, wherein the inner peripheral surface of the first ring-shaped part and the outer peripheral surface of the protrusion part are extended upwards and connected at a top portion, and the outer peripheral surface and the inner peripheral surface (A surface) of the first ring-shaped part have the diameter which is gradually increased as the outer peripheral surface and the inner peripheral surface (A surface) of the first ring-shaped part are away from the bumper head part. The outer peripheral surface and the inner peripheral surface of the second ring-shaped part have diameter formed in the same structure as the first ring-shaped part, so that the ring-shaped part 114 buckles to resist the load when load is applied to the bumper head part.

In addition, in order to prevent concentration of stress on the top portion by buckling of the buckling part 111, a stress buffer part 122 is disposed on the upper surface of the bumper head part 120.

Moreover, the stress buffer part 122 has a ring-shaped groove part 124 formed on the upper surface 121 of the bumper head part 120. The ring-shaped groove part 124 has an external face having a large diameter, an internal face having a diameter smaller than that of the external face, and a bottom face which connects the external face and the internal face with each other. Because the external face of the ring-shaped groove part is located inside more than the outer peripheral surface (B surface) of the first protrusion part, a refraction part 123 having a predetermined thickness is formed between the inner surface (the external face, the bottom face, and the internal face) of the ring-shaped groove part and the outer peripheral surface (B surface) of the first protrusion part.

Furthermore, when the buckling part starts buckling, the refraction part 123 is transformed while an interval between the external face and the internal face of the ring-shaped groove part is varied, and when shock is absorbed, stress concentrated on the top portion is dispersed.

Additionally, the compression part 130 is formed to absorb the shock when the shock is applied to the bumper head part 120. The protrusion part 160 includes: a first protrusion part 161 formed to be close to the bumper head part; and a second protrusion part 162 which is formed below the first protrusion part and has a diameter smaller than that of the first protrusion part. The compression part 130 includes: a first compression part 130*a* for absorbing shock by compression of the first protrusion part 161; and a second compression part 130*b* for absorbing shock by compression of the second protrusion part 162. The mounting unit 200 includes: a mounting coupling part 210 coupled with the coupling part 140; and a disc-shaped bottom surface 220 with a predetermined thickness connected with the mounting coupling part 210. The protrusion part 160 of the bumper unit 100 is formed in a cylindrical two-layer, and the first protrusion part 161 has a connection end portion 163 having a diameter larger than that of the second protrusion part 162.

In addition, the second compression part 130*b* moves downwards when the buckling part 111 buckles, and when the bottom surface 220 comes into contact with the second protrusion part 162, the second protrusion part 162 is compressed to absorb shock.

Moreover, the first compression part 130*a* has a guide cylinder 221 which has a predetermined height from the bottom surface 220 and has a cylindrical inner space part formed in the middle of the bottom surface 220 of the mounting unit 200, and the second compression part is inserted into the inner space part of the guide cylinder 221. When the second compression part is compressed and moves downwards, an upper end surface 223 of the guide cylinder 221 and the connection end portion 163 of the first protrusion part 161 come into contact with each other by the movement of the second compression part 130*b*. The first protrusion part 161 and the guide cylinder 221 are compressed, and at the same time, the second compression part 130*b* inside the guide cylinder 221 is also compressed in order to absorb shock.

Furthermore, the elastic part further includes an elastic air compression part 270 for absorbing shock by sealing the inside air.

Additionally, the elastic air compression part 270 is formed to have elastic force which can compress the inside air, to increase pressure, and to absorb shock when the bumper head part moves downwards and the bumper unit 100 is compressed by the load transferred to the bumper head part 120 in the state where the inside of the bumper unit 100 is sealed.

In addition, the elastic air compression part 270 includes an air discharge hole 222 penetrating through the bottom surface 220 at the center of the guide cylinder 221. The first compression part 130*a* moves downwards and touches the air discharge hole 222 formed in the bottom surface 220 so that the air discharge hole 222 is closed. Because the inside of the bumper unit is sealed, the first compression part 130*a* and the second compression part 130*b* are compressed by the load, and the bumper head part moves downwards so as to compress the inside air.

Moreover, another compression part is formed to absorb shock when shock is applied to the bumper head part 120, and includes: a guide cylinder 310 which has a cylindrical inner space part formed in the middle of the protrusion part 160 and has a predetermined length extending from the protrusion part 160; and a protrusion stopper 440 which has a cylindrical inner space part formed in the middle of the bottom surface 410 of the mounting unit 400 and has a predetermined length extending from the bottom surface 410.

The guide cylinder 310 into which the protrusion stopper 440 is inserted moves downwards when the buckling part 111 buckles. A ceiling part of the guide cylinder and the upper surface of the inserted protrusion stopper 440 come into contact with each other. When the ceiling part presses the upper surface of the protrusion stopper, the protrusion part is compressed to absorb shock.

Another elastic part includes a cylindrical head section 620 having a contact surface getting in contact with the surface of the door, and a cylindrical buckling section 610 for absorbing shock applied to the cylindrical head section 620 by buckling. The elastic part further includes a cylindrical buckling part which is mounted to have a space part between the bumper head part and the outer peripheral surface of the buckling part 111 in order to absorb shock applied from the cylindrical head section 620 by buckling.

Furthermore, the cylindrical buckling part includes the cylindrical head section 620 formed in a cylindrical doughnut shape of which the upper surface gets in contact with the surface of the door, and a cylindrical buckling section 610 connected with the cylindrical head section 620. An inner peripheral surface (C surface) where the cylindrical head section 620 and the cylindrical buckling section 610 meet each other has a structure that the diameter gets wider as being away from the bumper head part. Because the inner peripheral surface of the cylindrical buckling section 610 has the same diameter structure, when load is applied to the cylindrical head section, the section where the cylindrical head section 620 and the cylindrical buckling section 610 meet each other buckles to resist the load.

Additionally, preferably a base part 600 which has the same diameter as the inner peripheral surface of the second ring-shaped part and has the same cylindrical doughnut shape as the outer diameter of the cylindrical buckling section 610 to connect and support the second ring-shaped part and the cylindrical buckling section 610.

In addition, in order to compensate a difference of a gap formed by assembly of the door and the vehicle body, a height adjustment part 300 for adjusting the height between the bottom surface of the mounting unit and the upper surface of the bumper unit is disposed at the coupling part between the bumper unit and the mounting unit.

The mounting coupling part 210 of the mounting unit 200 has a male spiral part 211 formed to protrude on the inner surface thereof.

Furthermore, the coupling part 140 of the bumper unit 100 coupled with the mounting coupling part 210 has an insertion groove 141 into which the mounting coupling part 210 is inserted and coupled, a female spiral part 142 formed toward the inner diameter of the insertion groove 141, so that the mounting coupling part 210 is inserted and coupled into the coupling part 140.

Additionally, preferably, graduation parts 212 are formed on the outer surface of the male spiral part at regular intervals, so that a user can adjust a height (H) while checking a position where the bottom surface of the female spiral part 142 coupled with the male spiral part 211 meets the graduation parts 212.

In addition, the second protrusion part 162 has a plurality of key-shaped uneven grooves 133 formed on the outer peripheral surface thereof at regular intervals, and the guide cylinder 221 has one or more key-shaped protrusion parts 223 which are insertable into the grooves, so that the protrusion parts 223 are inserted and fixed into the uneven grooves 133.

Moreover, a support part 115 is formed on the lower surface of the buckling part 111 to support the buckling part 111, and a plurality of ribs 151 are formed on the outer surface of the buckling part 111 in order to prevent damage of the buckling part and adjust the degree of buckling of the buckling part. Ribs 152 are also formed on the outer peripheral surface of the support part 115, and the plurality of ribs 151 are formed to have strength to support the buckling part 111.

Additionally, a vehicle coupling part 230 has retaining protrusion parts 231 formed along the outer peripheral surface at regular intervals and a clip 233 having an elastic part 232.

The above and other objects, features and advantages of the present invention will be more clearly understood from the following detailed description taken in conjunction with the accompanying drawings.

The terms and words used in the specification and claims must not be limited to typical or dictionary meanings, but must be regarded as concepts selected by the inventor as concepts which best illustrate the present invention, and must be interpreted as having meanings and concepts adapted to the scope and spirit of the present invention to aid in understanding the technology of the present invention.

Advantageous Effects

The over-slam bumper according to an embodiment of the present invention can improve durability of the vehicle body and reduce noise greatly since the outer peripheral surface of the damping part can be buckled to generate uniform repulsive power when the door is closed.

Moreover, the over-slam bumper according to an embodiment of the present invention can secure a section that can provide uniform repulsive power since including the compression part for absorbing shock by compression to maintain uniform repulsive power and the elastically air compression part for absorbing shock by sealing the inside air.

Furthermore, the over-slam bumper according to an embodiment of the present invention can allow a worker to easily adjust a vertical movement amount since including a height adjusting part, which can adjust a height ranging from the side touching the vehicle body to the side touching the door of the upper side. Additionally, the over-slam bumper can enhance work efficiency and secure uniform quality without additional process to adjust the height while checking the graduation formed on the male spiral part.

MODE FOR INVENTION

Figure 1A:
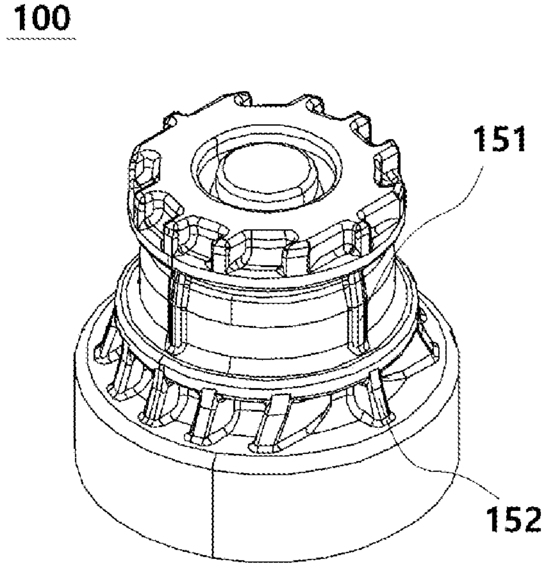
FIG. 1A is a perspective view illustrating a bumper unit according to a first embodiment of the present invention.
Figure 1B:
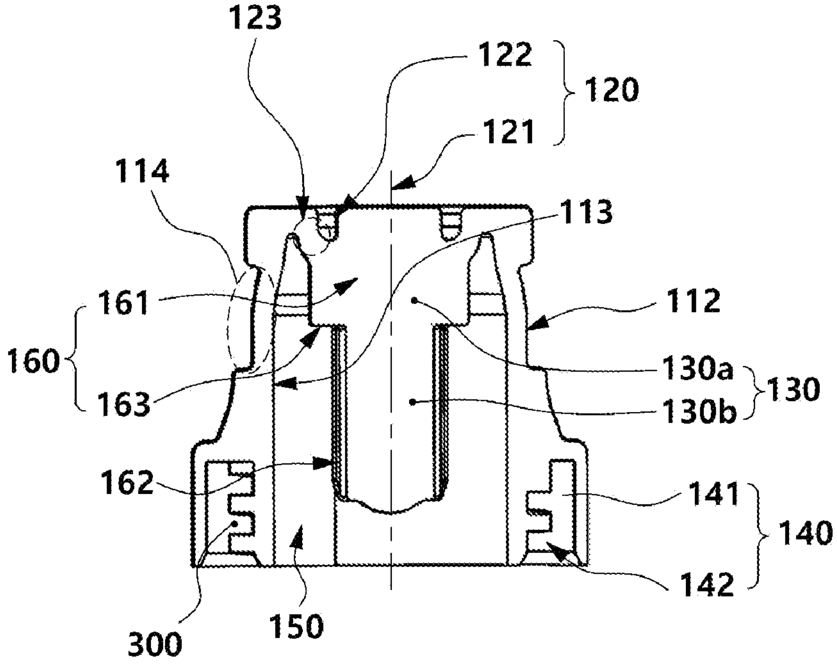
FIG. 1B is a sectional view illustrating a bumper unit according to a first embodiment of the present invention.
Figure 1C:
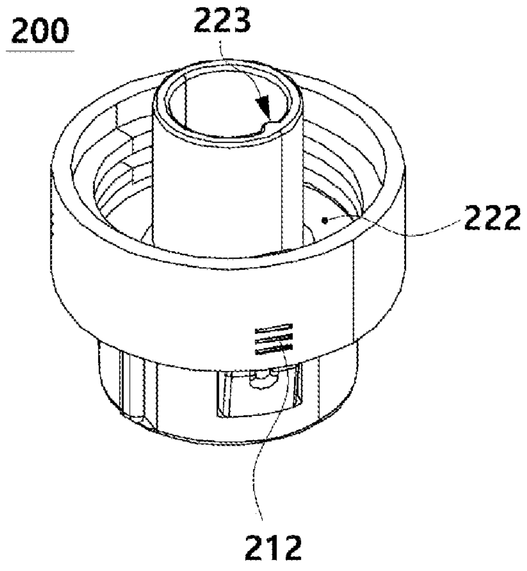
FIG. 1C is a perspective view illustrating a mounting unit according to a first embodiment of the present invention.
Figure 1D:
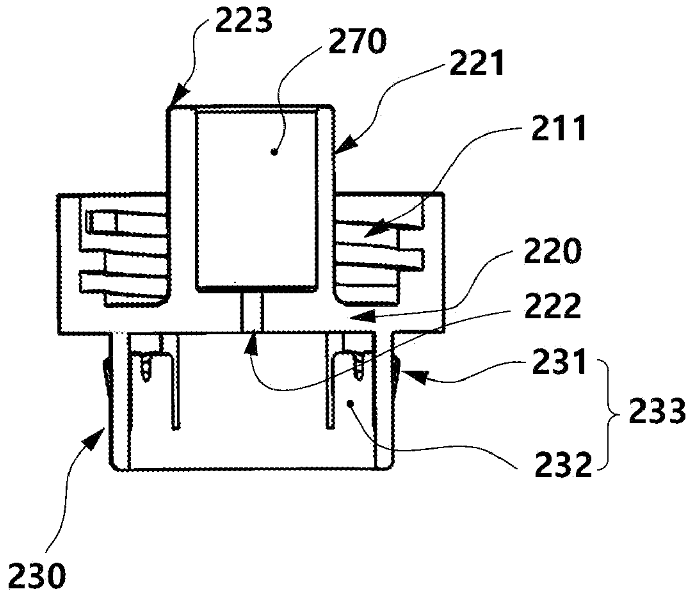
FIG. 1D is a sectional view illustrating a mounting unit according to a first embodiment of the present invention.

Hereinafter, preferred embodiments of the present invention will now be described in detail with reference to the attached drawings. In the drawings, thicknesses of lines and sizes of constituent elements may be exaggerated for clarity and convenience in explanation.

Further, wordings to be described later are defined in consideration of the functions of the present invention, and may differ depending on the intentions of a user or an operator or custom. Accordingly, such wordings should be defined on the basis of the contents of the overall specification.

In addition, the embodiment disclosed hereinafter does not limit the scope of the present invention, but corresponds to merely exemplary terms of constituent elements presented in claims of the present invention, and the embodiments that include replaceable constituent elements as equivalents of the constituent elements defined in the overall specification and claims may be included in the scope of the present invention.

Figure 2:
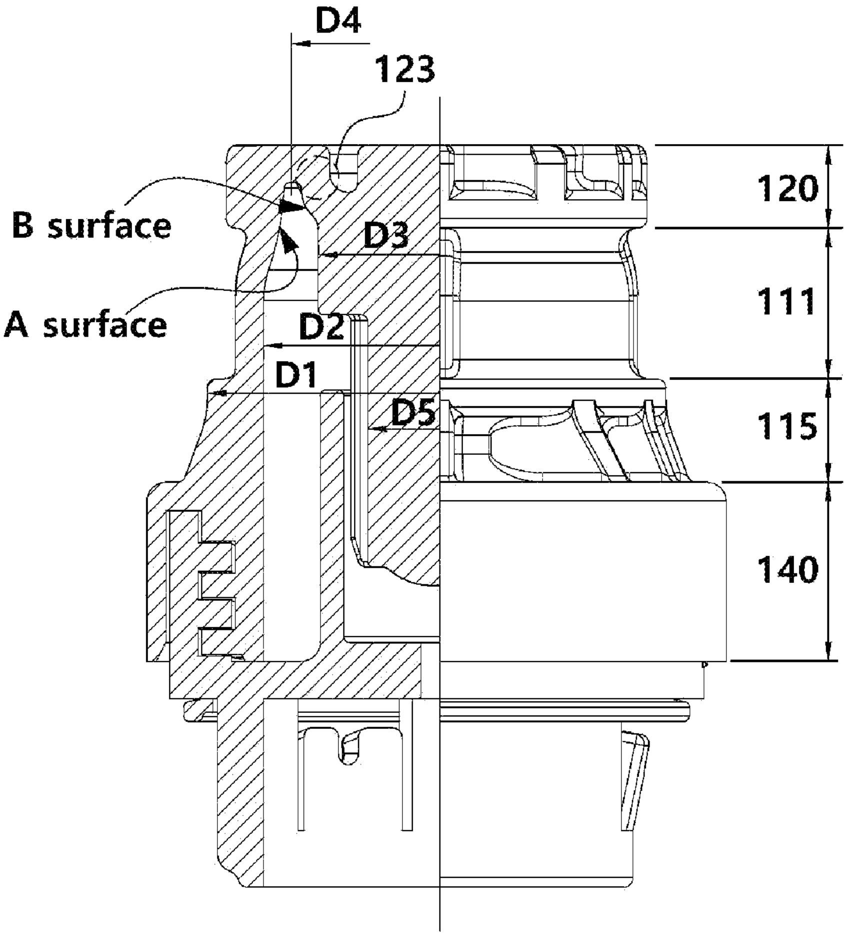
FIG. 2 is a partially sectional view illustrating an assembled state of an over-slam bumper according to the embodiment of the present invention.
Figure 3:
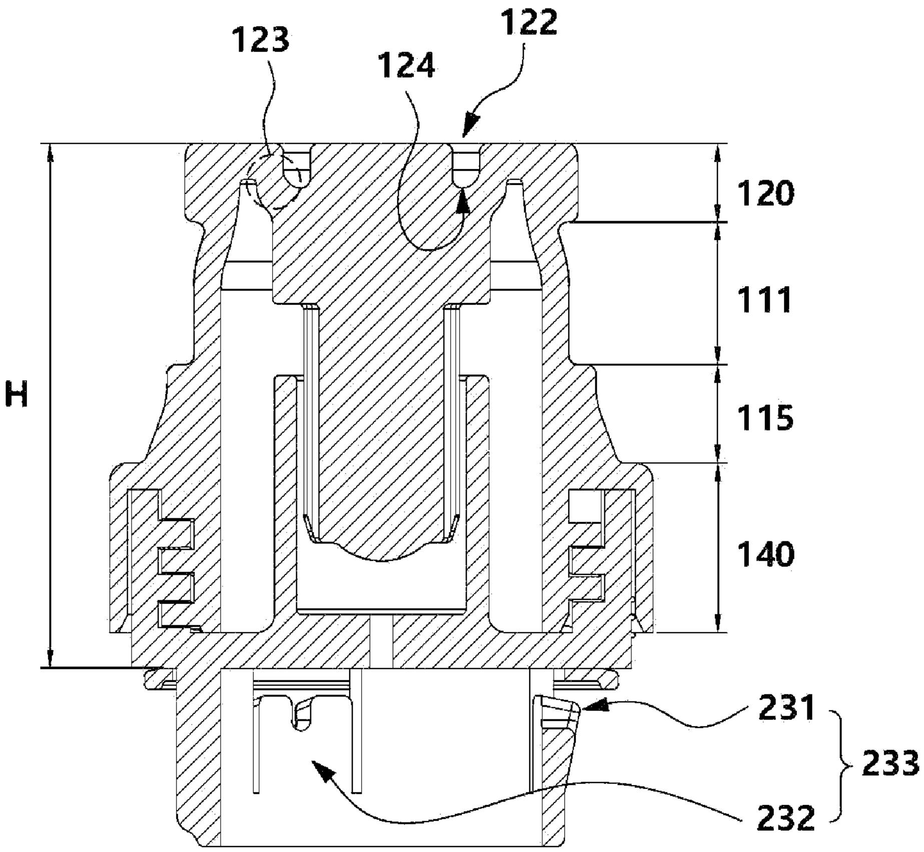
FIG. 3 is a sectional view illustrating the assembled state of the over-slam bumper according to the embodiment of the present invention.

FIGS. 1A-1D are a perspective view and a sectional view illustrating a bumper unit and a mounting unit according to a first embodiment of the present invention, FIG. 2 is a partially sectional view illustrating an assembled state of an over-slam bumper according to the embodiment of the present invention, and FIG. 3 is a sectional view illustrating the assembled state of the over-slam bumper according to the embodiment of the present invention.

Figure 4A:
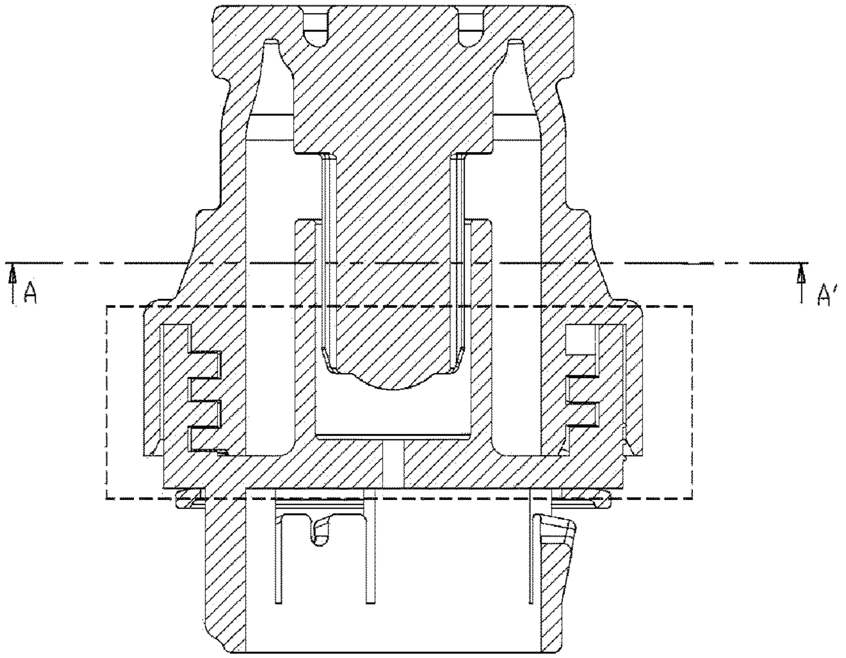
FIGS. 4A and 4B are sectional views illustrating a position fixing device according to the embodiment of the present invention.
Figure 4B:
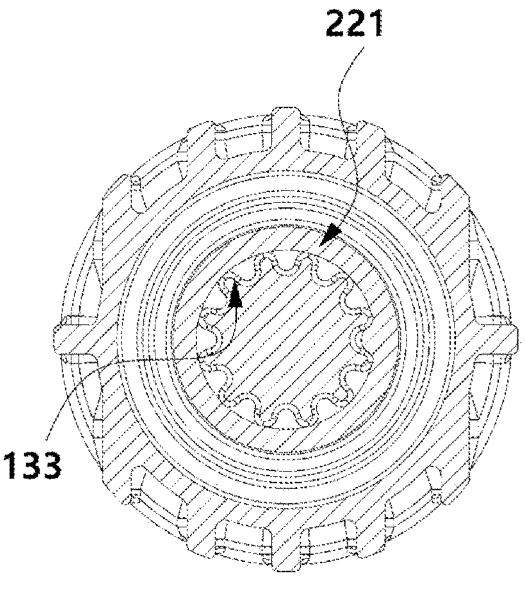
Figure 4C:
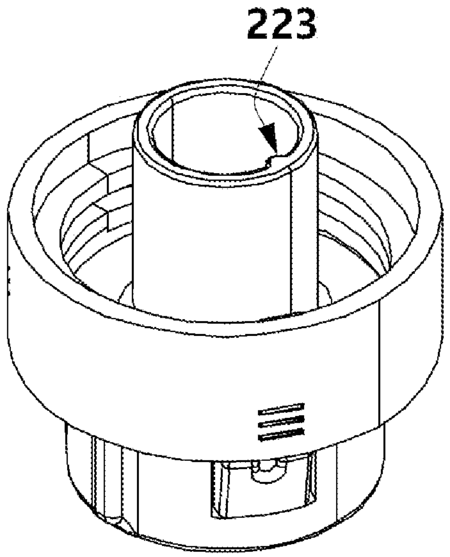
FIG. 4C is a perspective view illustrating a position fixing device according to the embodiment of the present invention.
Figure 5:
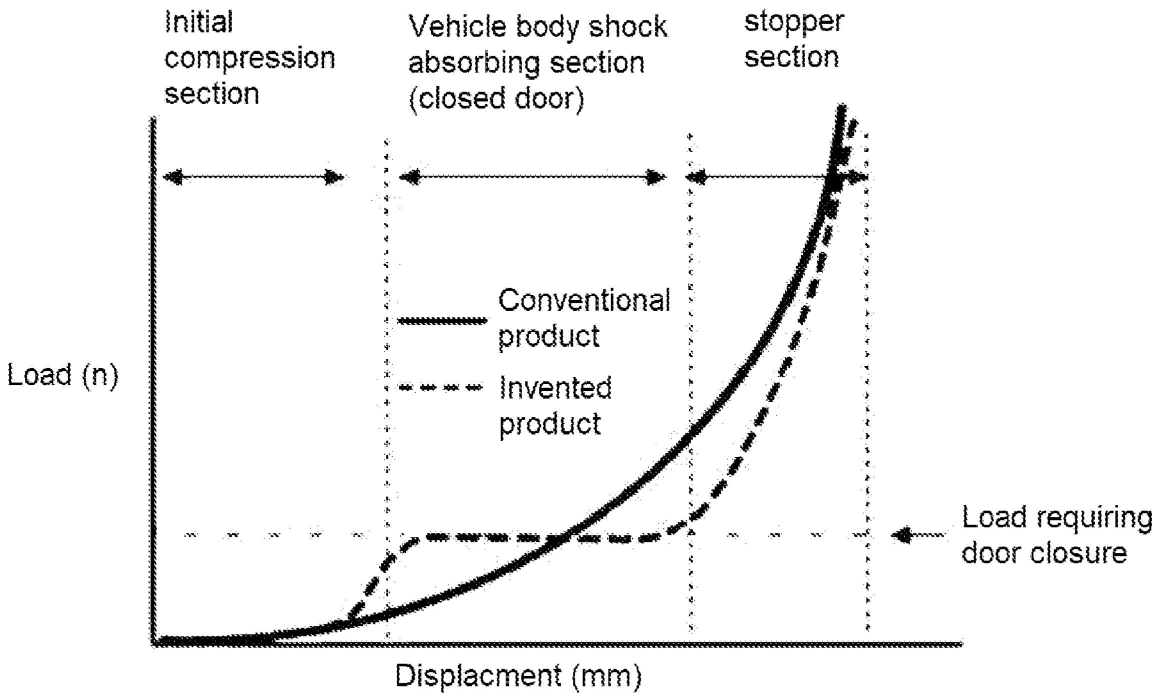
FIG. 5 is a graph of displacement and load according to the embodiment of the present invention.
Figure 6A:
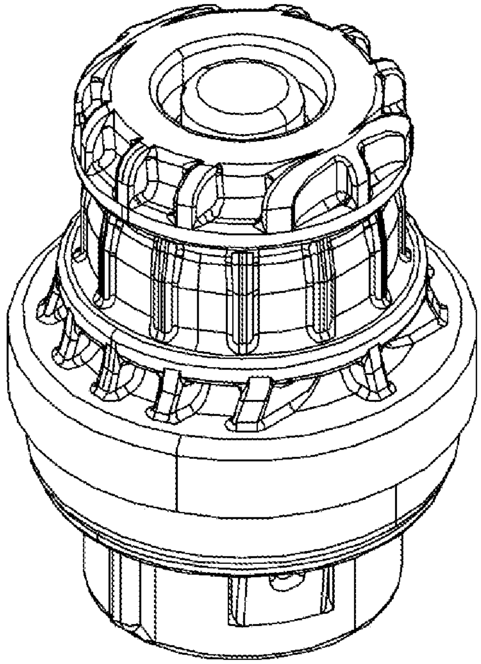
FIG. 6A is a perspective view illustrating a bumper unit according to a second embodiment of the present invention.
Figure 6B:
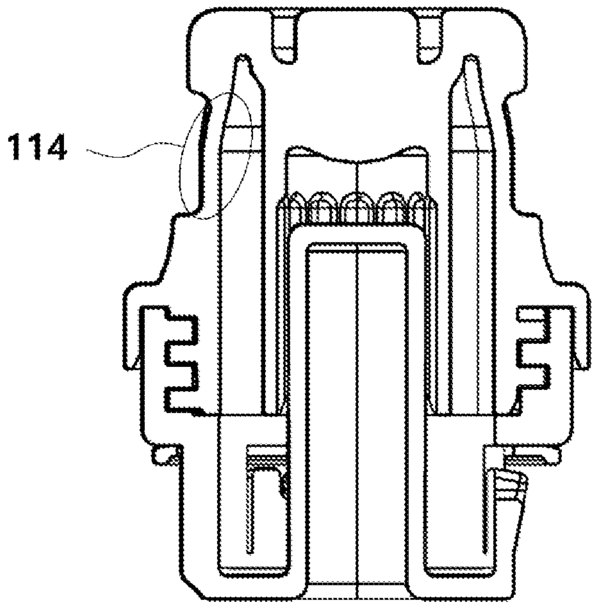
FIGS. 6B and 6C are sectional views illustrating a bumper unit according to a second embodiment of the present invention.
Figure 6C:
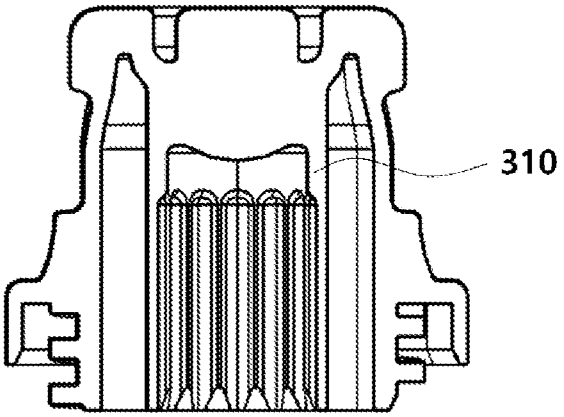
Figure 6D:
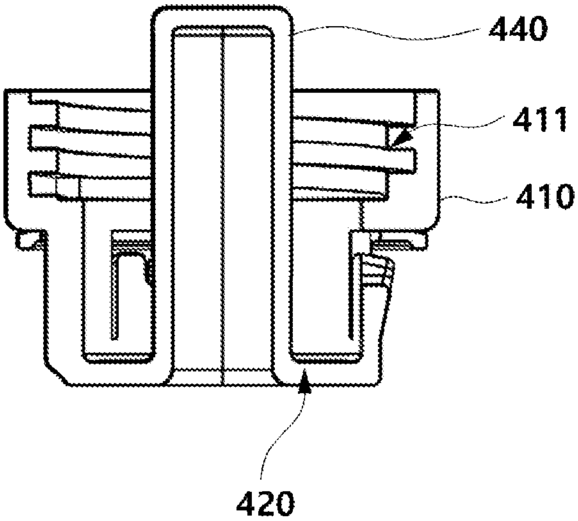
FIG. 6D is a sectional view illustrating a mounting unit according to a second embodiment of the present invention.

Moreover, FIGS. 4A-4C are a sectional view and a perspective view illustrating a position fixing device according to the embodiment of the present invention, and FIG. 5 is a graph of displacement and load according to the embodiment of the present invention.

FIGS. 6A-6D are a perspective view and sectional views illustrating a bumper unit and a mounting unit according to a second embodiment of the present invention, and FIGS. 7A-7D are a perspective view and sectional views illustrating a bumper unit and a mounting unit according to a third embodiment of the present invention.

The over-slam bumper according to the present invention is interposed between a vehicle door and a vehicle body.

As illustrated in FIGS. 1A to 3, the over-slam bumper includes: a bumper unit 100 of which an end portion protrudes toward the door to absorb shock generated between the vehicle body and the door; and a mounting unit 200 combined with the bumper unit 100 to fix the bumper unit to the vehicle body. The bumper unit 100 includes a bumper head part 120 having a contact surface getting in contact with the surface of the door, and an elastic part for absorbing shock applied to the bumper head part 120, and a coupling part 140 coupled with the mounting unit 200.

Moreover, the elastic part includes the bumper head part 120 having a contact surface getting in contact with the surface of the door, a buckling part 111 for absorbing shock by buckling when shock is applied to the bumper head part 120, and a compression part for absorbing shock by compression.

The buckling part 111 is formed below the bumper head part 120 in a cylindrical shape, a space part 150 opened downwards is formed inside the bumper unit 100, and a protrusion part 160 is formed on the space part 150 to be formed integrally with the bumper head part 120. Therefore, a ring-shaped part 114 is formed by an outer peripheral surface 112 of the buckling part 111 and an inner peripheral surface 113 of the space part. The ring-shaped part 114 is buckling-transformed by a load of the bumper head part 120.

Buckling is a phenomenon that a column or a thin plate is suddenly bent in a direction of a thin part at a predetermined load when the column or the thin plate is compressed and the bending action increases sharply. Buckling is generally easy to occur when a length is greater compared with a cross-sectional area.

In order to make the buckling phenomenon occur at a predetermined portion, a groove part may be formed on a cross section to vary the thickness or an inclined cross section may be formed at a predetermined portion.

Moreover, referring to FIG. 2, the ring-shaped part 114 includes a first ring-shaped part connected to the bumper head part, and a second ring-shaped part formed below the first ring-shaped part. The inner peripheral surface of the first ring-shaped part and the outer peripheral surface of the protrusion part are extended upwards and connected at a top portion. As the outer peripheral surface and the inner peripheral surface (A surface) of the first ring-shaped part are away from the bumper head part, the diameter gets wider. The outer peripheral surface and the inner peripheral surface of the second ring-shaped part have diameter formed in the same structure as the first ring-shaped part. Accordingly, it is preferable that the ring-shaped part 114 buckles to resist the load when load is applied to the bumper head part.

Furthermore, the inner peripheral surface and the outer peripheral surface of the connection part where the first ring-shaped part and the second ring-shaped part of the ring-shaped part 114 are connected form fluent curves to prevent that a specific part is damaged due to concentration of stress on the specific part.

Additionally, in order to prevent concentration of stress on the top portion by buckling of the buckling part 111, a stress buffer part 122 is disposed on the upper surface of the bumper head part 120.

In addition, the stress buffer part 122 has a ring-shaped groove part 124 formed on the upper surface 121 of the bumper head part 120. The ring-shaped groove part 124 has an external face having a large diameter, an internal face having a diameter smaller than that of the external face, and a bottom face which connects the external face and the internal face with each other. In this instance, because the external face of the ring-shaped groove part is located inside more than the outer peripheral surface (B surface) of the first protrusion part, it is preferable that a refraction part 123 having a predetermined thickness be formed between the inner surface (the external face, the bottom face, and the internal face) of the ring-shaped groove part and the outer peripheral surface (B surface) of the first protrusion part.

As described above, when buckling starts from the buckling part by shock of the door, an angle between an inner connection surface (A surface) and a protruding connection surface (B surface) which are connected from a diameter part (D4) of the top portion is increased. In order to prevent that stress is concentrated on the connection surface and the connection surface is damaged, the stress buffer part 122 is mounted on the upper surface of the bumper head part 120.

The stress buffer part 122 has the ring-shaped groove part 124 formed on the upper surface 121 of the bumper head part 120. The ring-shaped groove part 124 has an external face having a large diameter, an internal face having a diameter smaller than that of the external face, and a bottom face which connects the external face and the internal face with each other. In this instance, because the external face of the ring-shaped groove part is located inside more than the outer peripheral surface (B surface) of the first protrusion part, it is preferable that a refraction part 123 having a predetermined thickness be formed between the inner surface (the external face, the bottom face, and the internal face) of the ring-shaped groove part and the outer peripheral surface (B surface) of the first protrusion part.

Moreover, when the buckling part starts buckling, the refraction part 123 is transformed while an interval between the external face and the internal face of the ring-shaped groove part is varied. When shock is absorbed, stress concentrated on the top portion is dispersed.

Furthermore, referring to FIGS. 1A-1D, the compression part 130 is formed to absorb the shock when the shock is applied to the bumper head part 120. The protrusion part 160 includes: a first protrusion part 161 formed to be close to the bumper head part; and a second protrusion part 162 which is formed below the first protrusion part and has a diameter smaller than that of the first protrusion part. The compression part 130 includes a first compression part 130*a* for absorbing shock by compression of the first protrusion part 161 and a second compression part 130*b* for absorbing shock by compression of the second protrusion part 162.

The mounting unit 200 includes a mounting coupling part 210 coupled with the coupling part 140, and a disc-shaped bottom surface 220 with a predetermined thickness connected with the mounting coupling part 210. The protrusion part 160 of the bumper unit 100 is formed in a cylindrical two-layer. The first protrusion part 161 has a connection end portion 163 having a diameter larger than that of the second protrusion part 162.

Additionally, as illustrated in FIGS. 1A and 3, the second compression part 130*b* moves downwards when the buckling part 111 buckles. When the bottom surface 220 comes into contact with the second protrusion part 162, the second protrusion part 162 is compressed to absorb shock.

In addition, the first compression part 130*a* has a guide cylinder 221 which has a predetermined height from the bottom surface 220 and has a cylindrical inner space part formed in the middle of the bottom surface 220 of the mounting unit 200. The second compression part **130*b* is inserted into the inner space part of the guide cylinder 221. When the second compression part 130*b* is compressed and moves downwards, an upper end surface 223 of the guide cylinder 221 and the connection end portion 163 of the first protrusion part 161 come into contact with each other by the movement of the second compression part 130*b*. So, the first protrusion part 161 and the guide cylinder 221 are compressed, and at the same time, the second compression part 130*b* inside the guide cylinder 221** is also compressed in order to absorb shock.

Moreover, the elastic part further includes an elastic air compression part 270 for absorbing shock by sealing the inside air.

Furthermore, the elastic air compression part 270 is formed to have elastic force which can compress the inside air, increase pressure, and absorb shock when the bumper head part moves downwards and the bumper unit 100 is compressed by the load transferred to the bumper head part 120 in the state where the inside of the bumper unit 100 is sealed.

Additionally, the elastic air compression part 270 includes an air discharge hole 222 penetrating through the bottom surface 220 at the center of the guide cylinder 221. The first compression part **130*a* moves downwards and touches the air discharge hole 222 formed in the bottom surface 220 so that the air discharge hole 222 is closed. Because the inside of the bumper unit is sealed, the first compression part 130*a* and the second compression part 130*b*** are compressed by the load, and the bumper head part moves downwards so as to compress the inside air.

In addition, in order to compensate a difference of a gap formed by assembly of the door and the vehicle body, a height adjustment part 300 for adjusting the height between the bottom surface of the mounting unit and the upper surface of the bumper unit is disposed at the coupling part between the bumper unit and the mounting unit.

Moreover, as illustrated in FIGS. 6A-6D, in a second preferred embodiment of the present invention, the compression part is formed to absorb shock when shock is applied to the bumper head part 120. The compression part includes a guide cylinder 310 which has a cylindrical inner space part formed in the middle of the protrusion part 160 and has a predetermined length extending from the protrusion part 160; and a protrusion stopper 440 which has a cylindrical inner space part formed in the middle of the bottom surface 410 of the mounting unit 400 and has a predetermined length extending from the bottom surface 410. The guide cylinder 310 into which the protrusion stopper 440 is inserted moves downwards when the buckling part 111 buckles. A ceiling part of the guide cylinder and the upper surface of the inserted protrusion stopper 440 come into contact with each other. When the ceiling part presses the upper surface of the protrusion stopper, the protrusion part is compressed to absorb shock. As described above, the compression part mounted therein may be varied to various forms.

Figure 7A:
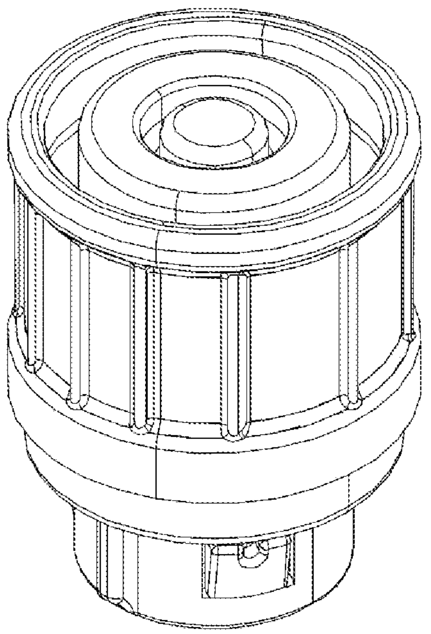
FIG. 7A is a perspective view illustrating a bumper unit according to a third embodiment of the present invention.
Figure 7B:
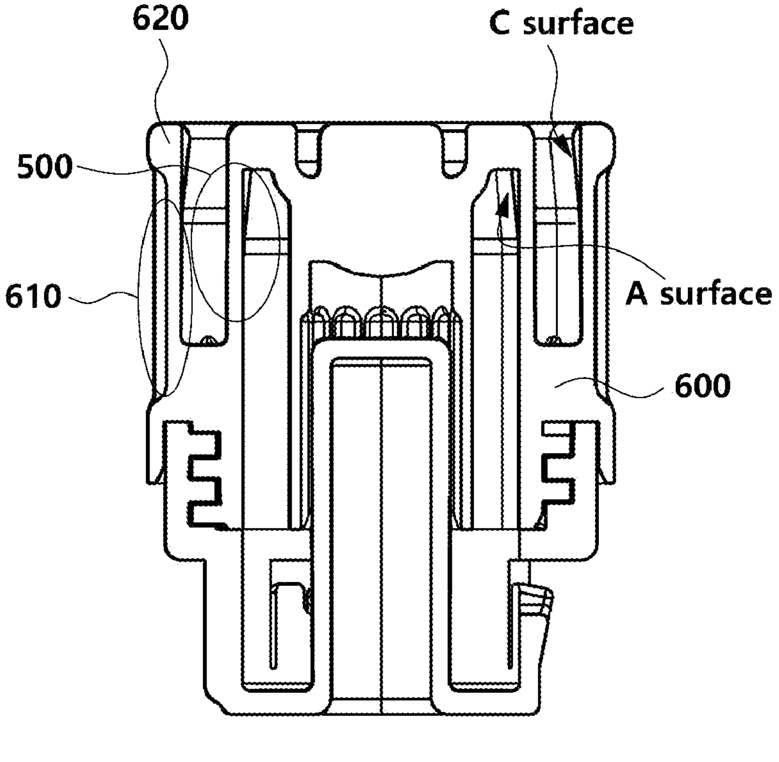
FIGS. 7B and 7C are sectional views illustrating a bumper unit according to a third embodiment of the present invention.
Figure 7C:
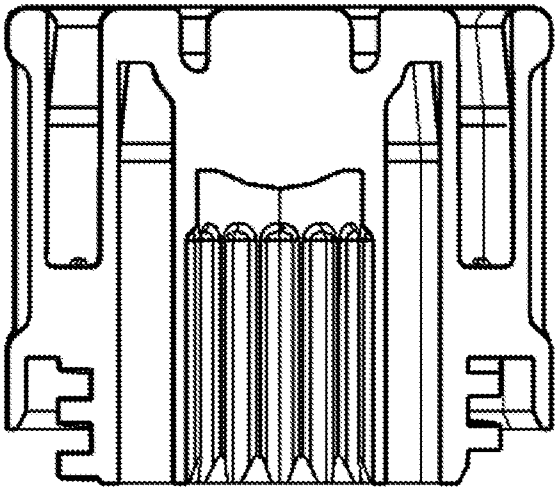
Figure 7D:
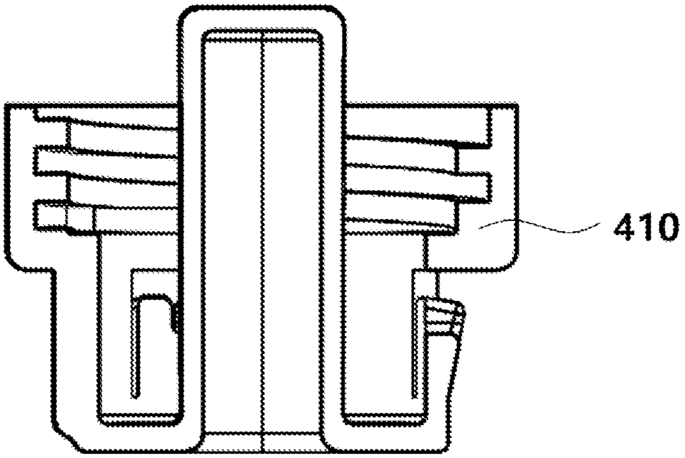
FIG. 7D is a sectional view illustrating a mounting unit according to a third embodiment of the present invention.

FIGS. 7A-7C illustrate an over-slam bumper according to a third preferred embodiment of the present invention.

The elastic part includes a cylindrical head section 620 having a contact surface getting in contact with the surface of the door, and a cylindrical buckling section 610 for absorbing shock applied to the cylindrical head section 620 by buckling.

The elastic part further includes a cylindrical buckling part which is mounted to have a space part between the bumper head part and the outer peripheral surface of the buckling part 111 in order to absorb shock applied from the cylindrical head section 620 by buckling.

Furthermore, the cylindrical buckling part includes the cylindrical head section 620 formed in a cylindrical doughnut shape of which the upper surface gets in contact with the surface of the door, and a cylindrical buckling section 610 connected with the cylindrical head section 620. An inner peripheral surface (C surface) where the cylindrical head section 620 and the cylindrical buckling section 610 meet each other has a structure that the diameter gets wider as being away from the bumper head part. Because the inner peripheral surface of the cylindrical buckling section 610 has the same diameter structure, when load is applied to the cylindrical head section, the section where the cylindrical head section 620 and the cylindrical buckling section 610 meet each other buckles to resist the load.

Additionally, preferably a support part 600 which has the same diameter as the inner peripheral surface of the second ring-shaped part and has the same cylindrical doughnut shape as the outer diameter of the cylindrical buckling section 610 to connect and support the second ring-shaped part and the cylindrical buckling section 610.

In addition, the bumper unit 100 is formed such that the outer peripheral surface buckles, and the buckling part can be applied to the outside or the inside, or all of the outside and the inside of the damper.

Moreover, intensity of buckling may be varied by ribs added to the outer diameter part of the buckling part or by grooves added to the outer diameter part, or the buckling part may have one of various shapes.

As described above, the forms of the buckling part, the ribs, and the bumper sections may be varied.

The mounting coupling part 210 of the mounting unit 200 has a male spiral part 211 formed to protrude on the inner surface thereof.

Furthermore, the coupling part 140 of the bumper unit 100 coupled with the mounting coupling part 210 has an insertion groove 141 into which the mounting coupling part 210 is inserted and coupled, a female spiral part 142 formed toward the inner diameter of the insertion groove 141, so that the mounting coupling part 210 is inserted and coupled into the coupling part 140.

Furthermore, the height adjustment part 300 checks the graduation formed on the outer surface of the male spiral part by the rotation of the female spiral part 142 of the bumper unit 100 coupled with the male spiral part 211 of the mounting unit 200 in order to adjust a height (H).

Therefore, the bumper unit and the mounting unit facilitate adjustment of a vertical movement amount of the height adjustment part, which can adjust the height from the contact surface getting in contact with the vehicle body to the surface getting in contact with the door of the upper side. Especially, because the height adjustment part can adjust the height while checking the graduation formed on the outer surface of the male spiral part, the over-slam bumper can enhance work efficiency and secure uniform quality without additional process to adjust a stepped difference.

Additionally, the second protrusion part 162 has a plurality of key-shaped uneven grooves 133 formed on the outer peripheral surface thereof at regular intervals, and the guide cylinder 221 has one or more key-shaped protrusion parts 223 which are insertable into the grooves, so that the protrusion parts 223 are inserted and fixed into the uneven grooves 133.

In addition, the uneven grooves 133 may be selectively mounted on the guide cylinder or on a protrusion type column if necessary.

When the height of the bumper unit and the height of the mounting unit are adjusted, the bumper unit and the mounting unit can be automatically fixed without any additional fixing device, and can maintain the fixed state without movement even by shock of the door.

Moreover, a support part 115 is formed on the lower surface of the buckling part 111 to support the buckling part 111, and a plurality of ribs 151 are formed on the outer surface of the buckling part 111 in order to prevent damage of the buckling part and adjust the degree of buckling of the buckling part. Ribs 152 are also formed on the outer peripheral surface of the support part 115, and the plurality of ribs 151 are formed to have strength to support the buckling part 111.

As described above, because lots of ribs 152 are formed on the outer peripheral surface of the support part 115, when shock and load are applied to the upper surface 121 of the bumper head part 120, even though buckling starts from the buckling part 111, the support part 115 below the buckling part can provide strength enough to support the buckling part without transformation.

Additionally, a vehicle coupling part 230 has retaining protrusion parts 231 formed along the outer peripheral surface at regular intervals and a clip 233 having an elastic part 232. When the vehicle coupling part 230 is inserted into an assembly hole formed in the vehicle body, the vehicle coupling part 230 is fixed to the vehicle body by the clip 233.

In addition, the bumper unit 100 may be made of thermoplastic resin, such as rubber, TPEE, TPU, and TPV, and preferably, is made of TPEE with less than 40 shore hardness to be recyclable.

Moreover, a buckling part which is formed in a cylindrical shape and has the same outer diameter as the outer peripheral surface of the coupling part 140. The upper end surface of the cylindrical buckling part has the same height as the bumper head part 120 so as to improve buckling intensity.

Although exemplary embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

[Explanation of Reference Numerals]

| | |
|---|---|
| 100: bumper unit | 111: buckling part |
| 120: bumper head part | 133: uneven groove |
| 140: coupling part | 150: space part |
| 160: protrusion part | 161: first protrusion part |
| 162: second protrusion part | |
| 163: connection end portion | |
| 210: mounting coupling part | 220: bottom surface |
| 300: height adjustment part | |
| 230: vehicle coupling part | |

The invention claimed is:

1. An over-slam bumper for a vehicle comprising:
a bumper unit (100) of which an end portion protrudes toward a door to absorb shock generated between a vehicle body and the door; and
a mounting unit (200) coupled with the bumper unit (100) to fix the bumper unit to the vehicle body,
wherein the bumper unit (100) includes:
an elastic part for absorbing shock generated when getting in contact with the door; and
a coupling part (140) connected to the elastic part and coupled with the mounting unit (200),
wherein the elastic part includes:
a bumper head part (120) having a contact surface getting in contact with the surface of the door;
a buckling part (111) for absorbing shock by buckling when shock is applied to the bumper head part (120); and
a compression part (130) for absorbing shock by compression.

2. The over-slam bumper according to claim 1, wherein the buckling part (111) is formed below the bumper head part (120) in a cylindrical shape,
a space part (150) opened downwards is formed inside the bumper unit (100),
a protrusion part (160) is formed on the space part (150) to be formed integrally with the bumper head part (120),
a ring-shaped part (114) is formed by an outer peripheral surface (112) of the buckling part (111) and an inner peripheral surface (113) of the space part, and
the ring-shaped part (114) is buckling-transformed by a load of the bumper head part (120).

3. The over-slam bumper according to claim 2, wherein the ring-shaped part (114) includes:
a first ring-shaped part connected to the bumper head part; and
a second ring-shaped part formed below the first ring-shaped part,
wherein the inner peripheral surface of the first ring-shaped part and the outer peripheral surface of the protrusion part are extended upwards and connected at a top portion, and the outer peripheral surface and the inner peripheral surface (A surface) of the first ring-shaped part have the diameter which is gradually increased as the outer peripheral surface and the inner peripheral surface (A surface) of the first ring-shaped part are away from the bumper head part, and
wherein the outer peripheral surface and the inner peripheral surface of the second ring-shaped part have diameter formed in the same structure as the first ring-shaped part, so that the ring-shaped part (114) buckles to resist the load when load is applied to the bumper head part.

4. The over-slam bumper according to claim 3, wherein in order to prevent concentration of stress on the top portion by buckling of the buckling part (111), a stress buffer part (122) is disposed on the upper surface of the bumper head part (120).

5. The over-slam bumper according to claim 4, wherein the stress buffer part (122) has a ring-shaped groove part (124) formed on the upper surface (121) of the bumper head part (120),
wherein the ring-shaped groove part (124) has an external face having a large diameter, an internal face having a diameter smaller than that of the external face, and a bottom face which connects the external face and the internal face with each other, and
wherein because the external face of the ring-shaped groove part is located inside more than the outer peripheral surface (B surface) of a first protrusion part, a refraction part (123) having a predetermined thickness is formed between the external face, the bottom face, and the internal face of the ring-shaped groove part and the outer peripheral surface (B surface) of the first protrusion part.

6. The over-slam bumper according to claim 5, wherein when the buckling part starts buckling, the refraction part (123) is transformed while an interval between the external face and the internal face of the ring-shaped groove part is varied, and when shock is absorbed, stress concentrated on the top portion is dispersed.

7. The over-slam bumper according to claim 2, wherein the compression part (130) is formed to absorb the shock when the shock is applied to the bumper head part (120), wherein the protrusion part (160) includes:

a first protrusion part (161) formed to be close to the bumper head part; and a second protrusion part (162) which is formed below the first protrusion part and has a diameter smaller than that of the first protrusion part, wherein the compression part (130) includes:

a first compression part (130*a*) for absorbing shock by compression of the first protrusion part (161); and a second compression part (130*b*) for absorbing shock by compression of the second protrusion part (162), wherein the mounting unit (200) includes:

a mounting coupling part (210) coupled with the coupling part (140); and a disc-shaped bottom surface (220) with a predetermined thickness connected with the mounting coupling part (210), and wherein the protrusion part (160) of the bumper unit (100) is formed in a cylindrical two-layer, and the first protrusion part (161) has a connection end portion (163) having a diameter larger than that of the second protrusion part (162).

8. The over-slam bumper according to claim 7, wherein the second compression part (130*b*) moves downwards when the buckling part (111) buckles, and when the bottom surface (220) comes into contact with the second protrusion part (162), the second protrusion part (162) is compressed to absorb shock.

9. The over-slam bumper according to claim 8, wherein the first compression part (130*a*) has a guide cylinder (221) which has a predetermined height from the bottom surface (220) and has a cylindrical inner space part formed in the middle of the bottom surface (220) of the mounting unit (200), wherein the second compression part (130*b*) is inserted into the inner space part of the guide cylinder (221), wherein when the second compression part (130*b*) is compressed and moves downwards, an upper end surface (223) of the guide cylinder (221) and the connection end portion (163) of the first protrusion part (161) come into contact with each other by the movement of the second compression part (130*b*), and wherein the first protrusion part (161) and the guide cylinder (221) are compressed, and at the same time, the second compression part (130*b*) inside the guide cylinder (221) is also compressed in order to absorb shock.

10. The over-slam bumper according to claim 1, wherein the elastic part further includes an elastic air compression part (270) for absorbing shock by sealing the inside air.

11. The over-slam bumper according to claim 10, wherein the elastic air compression part (270) is formed to have elastic force which can compress the inside air, increase pressure, and absorb shock when the bumper head part moves downwards and the bumper unit (100) is compressed by the load transferred to the bumper head part (120) in the state where the inside of the bumper unit (100) is sealed.

12. The over-slam bumper according to claim 10, wherein the elastic air compression part (270) includes an air discharge hole (222) penetrating through the bottom surface (220) at the center of a guide cylinder (221), wherein the first compression part (130*a*) moves downwards and touches the air discharge hole (222) formed in the bottom surface (220) so that the air discharge hole (222) is closed, and wherein because the inside of the bumper unit is sealed, the first compression part (130*a*) and the second compression part (130*b*) are compressed by the load, and the bumper head part moves downwards so as to compress the inside air.

* * * * *